No. 854,081. PATENTED MAY 21, 1907.
E. B. CURTIS.
REEL FOR WAGONS.
APPLICATION FILED OCT. 19, 1906.
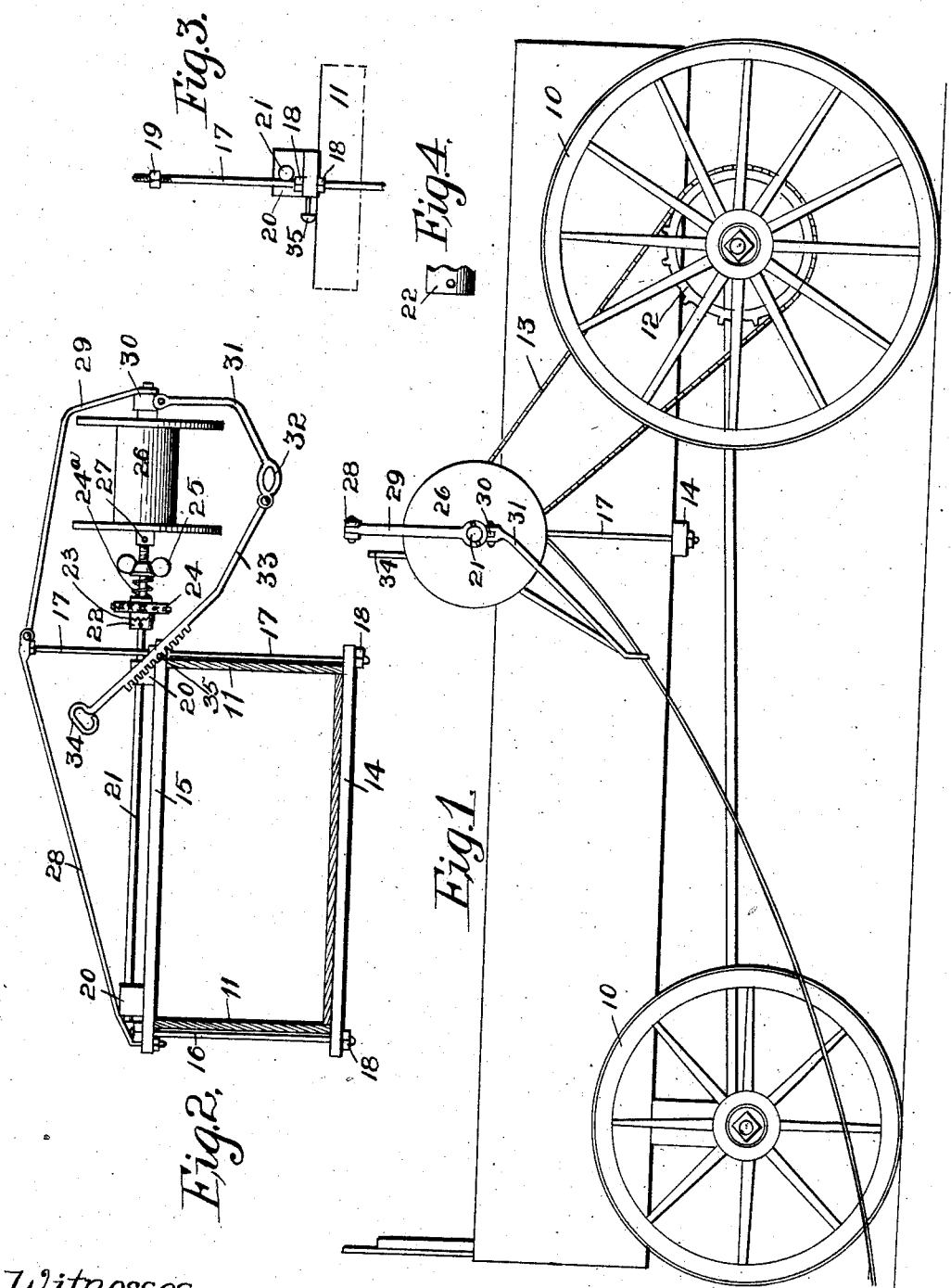
Witnesses
A. G. Hague
S. F. Christy.
Inventor, E. B. Curtis
by Owing & Lane attys

UNITED STATES PATENT OFFICE.

EDWARD B. CURTIS, OF PARKER, SOUTH DAKOTA.

REEL FOR WAGONS.

No. 854,081.　　Specification of Letters Patent.　　Patented May 21, 1907.

Application filed October 19, 1906. Serial No. 339,688.

*To all whom it may concern:*

Be it known that I, EDWARD B. CURTIS, a citizen of the United States, residing at Parker, in the county of Turner and State of South Dakota, have invented a certain new and useful Reel for Wagons, of which the following is a specification.

The object of my invention is to provide a device designed to be quickly and easily attached to an ordinary wagon and capable of automatically reeling up wire or the like, as the wagon containing the attachment is advanced along side of the wire.

A further object is to provide means by which the tension of the wire as it is reeled upon the spool may be adjusted by the operator, and further to provide means by which the wire may be guided by the operator to lie flat upon the spool.

My invention consists in the construction, arrangement and combination of the various parts of the attachment, whereby the objects contemplated are attained, as hereinafter more fully set forth, pointed out in my claims and illustrated in the accompanying drawings, in which—

Figure 1 shows a side elevation of a wagon containing my attachment with the spool thereon and a wire connected with the spool ready to be reeled thereon. Fig. 2 shows a transverse sectional view of the wagon bed illustrating my improvement in position thereon. Fig. 3 shows a detail end view of a portion of the frame that supports the attachment on the wagon bed, and Fig. 4 shows an enlarged detail view of one of the clutch members.

Referring to the accompanying drawings, I have used the reference numeral 10 to indicate the wagon wheels, and 11 the wagon bed, which are of the ordinary construction. Connected with one of the rear wheels of the wagon is a sprocket toothed rim 12, and passed around said sprocket rim is the sprocket chain 13.

My attachment for the wagon comprises a cross piece 14, designed to pass under the wagon bed and project slightly beyond the sides thereof, and a cross piece 15 designed to pass over the top of the wagon bed. These cross pieces are connected by a bolt 16 passed through the ends of the parts 14 and 15, beyond one side of the wagon and by a bolt 17 passed through the ends at the other side of the wagon, said bolt projecting a considerable distance above the cross piece 15. On these bolts 16 and 17 are nuts 18 which may be adjusted to firmly clamp said cross pieces to the wagon bed, and on the top of the bolt 17 is a nut 19, for purposes hereinafter made clear. On top of the cross piece 15 are two bearing blocks 20 in which is mounted the rotatable shaft 21, which shaft projects a considerable distance beyond one side of the wagon bed. Fixed to this shaft 21 is a clutch member 22 having a roughened surface which is in engagement with the roughened surface of a mating clutch 23. This mating member 23 is rotatably mounted upon the shaft 21 and which is formed with a sprocket wheel 24. The sprocket wheel 24 has the chain 13 passed around it. The end of the clutch member 23 opposite from the clutch member 22 is engaged by an extensible coil spring 24ª, and the other end of the spring is in engagement with a thumb nut 25 on the shaft 27.

The reference numeral 26 indicates a wire spool of ordinary construction mounted upon the shaft 21, and held in place thereon by a pin 27. I provide for supporting the projecting outer end of the shaft 21 by means of a brace rod 28 fixed at one end to the cross piece 15 and mounted at its other end on the top of the rod 17, and supported by the nut 19. Pivotally connected with the upper end of the rod 28 is an arm 29 having an opening at its lower end designed to receive the outer end of the shaft 21. Rotatably mounted upon the shaft 21 between the spool and the arm 29 is a collar 30 to which is pivoted an arm 31 inclined downwardly, and then inwardly and formed with a guide eye 32. Connected with the lower end of the arm 31 is a rack bar 33 formed with a handle 34 arranged to have its teeth engage a pin 35 secured to one of the bearing blocks 20.

In practical use I assemble the parts of my improvement on a wagon as follows: I first place the cross pieces 14 and 15 in position and hold them in place by the nuts 18. I then place a spool upon the shaft 21 and secure the spool to the shaft. I then place the collar 30 on the outer end of the shaft and the arm 29 on the same shaft adjacent to said collar. I then turn the nut 19 upwardly until the arm 29 is elevated far enough to firmly support the outer end of the shaft 21. I then pass one end of the wire to be wound through the guide eye 32, and attach it to the spool. I then advance the wagon along the line parallel with the wire, and the sprocket gearing connected with the wire, when the shaft 31 causes the spool to be rotated in a direction required for reeling up the wire. I arrange the sprocket gearing in such manner that when the wire is first wound upon an empty spool, the spool will be rotated at such speed that the wire will be tightly wound upon it. Obviously, as the various layers of wire are wound upon the spool and the spool is rotated at the same speed proportionate to the advance of the wagon, that the wire would be reeled too fast. This difficulty is obviated by the clutch devices and spring connecting the sprocket wheel 23 with the shaft, for when the sprocket wheel 23 is rotated farther than the wire can be wound upon the spool, the said sprocket wheel will slip relative to the clutch member, and then as soon as there is any slack in the wire, the spring 24 will again cause it to be rotated in unison with the shaft 21. If it is desired to wind the wire very tightly upon the spool, the thumb nut 25 is adjusted to cause the spring 24 to bear heavily upon the adjacent side of the sprocket wheel, or if it desired to wind the wire loosely upon the spool, the nut is turned away from the sprocket wheel. When the spool has been filled with wire, the operator elevates the arm 29, removes the collar 30 and the pin 27 and then slides the spool from the shaft, and a new spool may be substituted and filled in the same manner. The operator on the wagon may very easily control the winding of the wire upon a spool so that it will be uniform by manipulating the handle 34, or if desired, he may set the rack 33 to position where it will wind the wire to the center of the spool or to either side thereof as is desired.

Having thus described my invention, what I claim and desire to secure by Letters Patent of the United States, therefor is—

1. The combination with a wagon bed, of a cross piece below the wagon and a cross piece above the wagon bed, two bolts connecting said cross pieces, one of them projected above the upper cross piece and projected beyond one side of the wagon, and a brace connected at one end with one end of the upper cross piece and at its other end with the top of the upwardly projected bolt, and an arm pivoted to said brace and detachably connected with the outer end of the shaft.

2. The combination of a wagon bed, a frame secured to the wagon bed, a wire reeling shaft mounted in the frame and projected beyond the side of the wagon bed, a collar detachably and rotatably mounted on the outer end of the shaft, an arm pivoted to said collar and formed with a wire guiding eye, a rack pivoted to said arm, and a pin connected with the frame to be engaged by said rack.

EDWARD B. CURTIS.

Witnesses:
J. W. CHASE,
C. S. COSTAIN.